(12) United States Patent
Liu et al.

(10) Patent No.: US 8,411,585 B2
(45) Date of Patent: Apr. 2, 2013

(54) NETWORK INTERFERENCE EVALUATING METHOD, DYNAMIC CHANNEL ASSIGNMENT METHOD AND APPARATUS USED IN WIRELESS NETWORKS

(75) Inventors: Yongqiang Liu, Beijing (CN); Yanlin Luo, Beijing (CN); Songjie Chen, Beijing (CN); Gang Wang, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 802 days.

(21) Appl. No.: 12/498,878

(22) Filed: Jul. 7, 2009

(65) Prior Publication Data
US 2010/0008316 A1    Jan. 14, 2010

(30) Foreign Application Priority Data
Jul. 10, 2008    (CN) .......................... 2008 1 0136147

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 4/00* | (2009.01) |
| *H04W 72/00* | (2009.01) |
| *H04B 7/00* | (2006.01) |
| *H04B 1/00* | (2006.01) |
| *H04B 15/00* | (2006.01) |
| *H04B 17/00* | (2006.01) |

(52) U.S. Cl. ........ 370/252; 370/329; 370/338; 455/450; 455/509; 455/63.1; 455/67.13

(58) Field of Classification Search .................. 370/252, 370/329, 338; 455/450, 509, 63.1, 67.13
See application file for complete search history.

(56) References Cited

U.S. PATENT DOCUMENTS
4,271,507 A * 6/1981 Gable et al. .................. 370/432
6,385,173 B1 * 5/2002 Lindskog et al. ............. 370/252
(Continued)

FOREIGN PATENT DOCUMENTS
JP    2006-054849 A    2/2006

OTHER PUBLICATIONS
Colin McDiarmid and Bruce Reed, "Channel Assignment and Weighted Coloring", Networks, 2000, pp. 114-117, vol. 36(2).
(Continued)

*Primary Examiner* — Alpus H Hsu
*Assistant Examiner* — Yee Lam
(74) *Attorney, Agent, or Firm* — Sughrue Mion, PLLC

(57) ABSTRACT

There are disclosed a network interference evaluating method, a dynamic channel assignment method and apparatus used in wireless networks. The dynamic channel assignment method used in a wireless network, comprising steps of: calculating each pair of visual delayed time for each pair of basic service sets based on received signal strength indicators, traffic information and rate information, and evaluating an overall network interference under a current channel allocation based on the calculated visual delayed time; constructing an undirected graph so that each basic service set is located at a vertex, and each connection line between each pair of basic service sets has a weight obtained from the pair of visual delayed time for this pair of basic service sets; coloring the undirected graph to get a new channel allocation approach and an optimized minimal overall network interference under this new channel allocation approach; comparing a difference between the evaluated overall network interference under the current channel allocation and the optimized minimal overall network interference with a predetermined threshold; and changing channel allocation for the basic service sets according to the new channel allocation approach if the difference is larger than the predetermined threshold.

10 Claims, 5 Drawing Sheets

U.S. PATENT DOCUMENTS

| | | | |
|---|---|---|---|
| 7,110,374 B2 | 9/2006 | Malhotra et al. | |
| 7,684,464 B2* | 3/2010 | Linsky et al. | 375/132 |
| 8,040,857 B2* | 10/2011 | Wang et al. | 370/337 |
| 2004/0090929 A1* | 5/2004 | Laux et al. | 370/311 |
| 2004/0202146 A1* | 10/2004 | Lee | 370/350 |
| 2005/0117520 A1* | 6/2005 | Miyoshi | 370/238 |
| 2005/0268181 A1* | 12/2005 | Murty et al. | 714/704 |
| 2006/0072502 A1* | 4/2006 | Crandall et al. | 370/329 |
| 2006/0099956 A1* | 5/2006 | Harada et al. | 455/452.2 |
| 2006/0262766 A1* | 11/2006 | Peleg | 370/338 |
| 2007/0197246 A1* | 8/2007 | Julian | 455/515 |
| 2007/0249361 A1* | 10/2007 | Klang et al. | 455/452.2 |
| 2008/0010304 A1* | 1/2008 | Vempala et al. | 707/100 |
| 2008/0045174 A1* | 2/2008 | Chen et al. | 455/187.1 |
| 2008/0151821 A1* | 6/2008 | Cho et al. | 370/329 |
| 2009/0180444 A1* | 7/2009 | McManus et al. | 370/332 |
| 2009/0290494 A1* | 11/2009 | Govindan et al. | 370/238 |
| 2010/0284381 A1* | 11/2010 | Hirsch | 370/338 |

OTHER PUBLICATIONS

A. Frieze and M. Jerrum, "Improved approximation algorithms for MAX k-CUT and MAX Bisection". Algoritmica, 18, 1997, pp. 1-20.

Arunesh Mishra, Suman Banerjee, and William Arbaugh, "Weighted Coloring Based Channel Assignment for WLANs", Mobile Computer Communications Review (MC2R), vol. 9, No. 3, 2005.

* cited by examiner

NETWORK INTERFERENCE EVALUATING METHOD, DYNAMIC CHANNEL ASSIGNMENT METHOD AND APPARATUS USED IN WIRELESS NETWORKS

BACKGROUND OF THE INVENTION

1. Field of Invention

This invention relates to wireless network such as 802.11 WLANs, and more particularly, to a network interference evaluating method, a dynamic channel assignment method and apparatus used in the wireless network.

2. Description of Prior Art

Wireless networks such as 802.11 WLANs have enjoyed an unprecedented adoption rate in recent years. Generally, the network contains several cells and each cell includes one base station (BS) and many mobile stations (STAs) associated with it. The communications of the STAs must be relayed by the BS. In the context, we use 802.11 WLAN as an example to discuss the issue details, but it shall be noted that the present invention is not intended to be limited in the 802.11 WLAN scenario. In the 802.11 WLANs, the cell is called BSS (Basic Service Set), the BS is called Access Point (AP) and channel refers to wireless frequency spectrum allotted to the WLAN. The 802.11 specification defines a fixed number of channels for use. For example, 802.11b (2.412-2.462 GHz) defines 11 channels.

A fundamental issue in these networks is the interference. Because of the broadcast nature of wireless medium, the transmission from one sender-receiver pair affects those of other pairs. From micro view, the interference amount is relevant with the signal strength. When a packet is sent from a node v to a node u, whether it can be received successfully or not depends on the SINR (Signal to Interference-Noise Ratio) on the interface of the receiver u and the transmission rate of the sender v. Then $$SINR(u, v) = \frac{\text{Signal Strength from } v}{\text{Background Noise around } u + \text{Interference to } u} \quad (1)$$

$$= \frac{G_{v,u} \cdot P_v}{N_u[CH(u)] + \sum_{a \in V, a \notin AP(u)} I(a, u)}$$

$$I(a, u) = G_{a,u} \cdot P_a \cdot 1_{\{CH(a)=CH(u)\}}$$

In the Equation (1), $N_u[CH(u)]$ is the background noise of the channel $CH(u)$. a is another sender in the different BSSs, $P_v$ and $P_a$ are the original power level from the senders' network interface. $G_{v,u}$ and $G_{a,u}$ are the propagation attenuation factors, which are correlated with the path environments and very hard to compute with the mathematical models. When the SINR becomes worse, the transmitting node needs to lower PHY (physical) rate to prevent any packet corruption. For 802.11 WLANs, the relationship between the PHY rate and SINR is shown in Table 1.

TABLE 1

SINR & PHY Data Rate Table

| 802.11 std | PHY Rate (M bps) | SINR (dbm) |
|---|---|---|
| b | 1 | −2.92 |
| b | 2 | 1.59 |
| b | 5.5 | 5.98 |
| b | 11 | 6.99 |
| a/g | 18 | 23 |
| a/g | 24 | 25 |
| a/g | 36 | 28 |
| a/g | 48 | 32 |
| a/g | 54 | 35 |

From macro view, the interference is proportional to the traffic of the interferer because more traffic leads to longer duration of signal interference.

In wireless network optimization, we need to predict interference under different network parameters. For example, if we want to find the best channel assignment of the network, we need to predict interference degrees under different channel allocations and select one with the minimal global interference. The accuracy of interference prediction directly impacts the optimization performance. Similar requirement is needed in other optimizations such as power control and network-diagnosis.

Current estimation of the interference is highly inaccurate.

Most existing works such as Reference [1] define interference based on simple, abstract model of radio propagation—the interference range is twice the communication range. When the receiver is in the interference range of the interferer, the interference between them is 1. Otherwise, it is set into 0.

Authors in Reference [2] provide a method of automatic channel decision and an automatic channel allocation system for access points. In their solution, signal strength between access points is used as the interference amount, which is more sophisticated than Reference [1].

Besides interfering signal strength, the authors in Reference [3] take into account the traffic load of interferers. In their solution, The AP periodically switches into a channel j and listens on the channel j for T ms. Then, AP determines the T_load and T_interference and calculates CS(j) and CI(j), which are the monitored load and interfering energy in the channel j respectively. Finally, AP determines an optimal channel j with the minimal (CS(j)+CI(j)).

In Reference [4], the authors propose a station-aware interference metric—

$$W(ap_i, ap_j) = \frac{Num_{ap_i}(ap_j) + Num_{ap_j}(ap_i)}{Num_{ap_i} + Num_{ap_j}},$$

where $Num_{api}$ is the STA number in the BSS of APi, $Num_{api}(ap_j)$ is the number of STAs that are associated APi but can hear the beacons from APj; and $Num_{ap_j}$ is the STA number in the BSS of APj, $Num_{ap_j}(ap_i)$ is the number of STAs that are associated APj but can hear the beacons from APi.

SUMMARY OF THE INVENTION

The goal of the invention is to use real-time measurements on a wireless network to capture its radio frequency characteristics and accurately predict how it will perform when running under different settings, and to dynamically allocate the channel resources to various APs to achieve an optimal system overall performance.

As a conclusion, the existing methods only consider two factors: the signal power between the interferer and the receiver (hereunder it is referred to as "interfering signal"), the traffic amount of the interferer (hereunder it is referred to as "interfering traffic"). However, other factors directly impacting the performance of interference are not well addressed in the proposed methods, they are:
1. The signal power between the sender and the receiver (hereunder it is referred to as "good signal")
2. The traffic amount of the receiver.
3. SINR rate table Without the information, interference prediction loses accuracy in some scenarios. For example:
1. For two receivers A and B, when the strengths of their interfering signals are the same, but the receiver A is closer to its sender than the receiver B. In practice, the packet loss of the receiver A is much less than the receiver B, which means the interference degree the receiver A suffering is less than that of the receiver B. However, the existing methods fail to imply the situation, because it is not relevant with good signal.
2. Even if the receiver B is suffering from strong interfering signal, there is no actual interference impact to the receiver B if the receiver B has no traffic to communicate at this time. Because interference is caused by packet transmission collision.
3. When we want to reduce the interference on the receiver B, how much shall the sending power be increased for its sender?

The invention proposes an interference degree prediction metric for more accurately predicting a network performance. The metric is visual delayed time, which means the visual increased transmission time due to interference. It reasonably incorporates four important interference-relevant factors into one equation:
1. signal strength between the sender and the receiver;
2. signal strength between the interferer and the receiver;
3. traffic demands of each node.
4. SINR-RATE table.

According to a first aspect of the present invention, there is provided a dynamic channel assignment method used in a wireless network, comprising steps of: calculating each pair of visual delayed time for each pair of basic service sets based on received signal strength indicators, traffic information and rate information, and evaluating an overall network interference under a current channel allocation based on the calculated visual delayed time; constructing an undirected graph so that each basic service set is located at a vertex, and each connection line between each pair of basic service sets has a weight obtained from the pair of visual delayed time for this pair of basic service sets; coloring the undirected graph to get a new channel allocation approach and an optimized minimal overall network interference under this new channel allocation approach; comparing a difference between the evaluated overall network interference under the current channel allocation and the optimized minimal overall network interference with a predetermined threshold; and changing channel allocation for the basic service sets according to the new channel allocation approach if the difference is larger than the predetermined threshold.

Preferably, the coloring may be done with the semi-definite programming technology.

Preferably, the weight may be equal to the sum the pair of visual delayed time for the pair of access points.

Preferably, the step of calculating may include sub-steps of: for a group of first nodes forming a first basic service set and a group of second nodes forming a second basic service set, calculating the visual delayed time of each of the first nodes under the interference from the group of second nodes by using calculated normal transmission time of the first nodes and calculated delayed transmission time of the first nodes; and summing all the visual delayed time of the group of first nodes to obtain a visual delayed time of the first basic service set under the interference from the second basic service set.

Preferably, the step of calculating may further include sub-steps of: calculating normal transmission time of each first node by using the traffic information and the rate information; mapping out lowered transmission rates of the first node by using an SINR-Rate table and based on the received signal strength indicators; and calculating a delayed transmission time of the first node under the interference from the group of second nodes by using the traffic information, the rate information and the mapped lowered transmission rates of the first node.

Preferably, the group of first nodes may include a first access point and a group of first terminals accessing the wireless network via the first access point, and the group of second nodes may include a second access point and a group of second terminals accessing the wireless network via the second access point.

Preferably, the overall network interference under the current channel allocation may be evaluated as the total sum of all interferences between respective pairs of basic service sets under the current channel allocation. Interference between a pair of basic service sets is equal to the sum of the pair of the calculated visual delayed time for the pair of basic service sets if the pair of basic service sets are using one and the same channel under the current channel allocation, whereas interference between a pair of basic service sets is equal to zero if the pair of basic service sets are using different channels under the current channel allocation.

According to a second aspect of the present invention, there is provided an overall network interference evaluating method, comprising steps of: calculating each pair of visual delayed time for each pair of basic service sets based on received signal strength indicators, traffic information and rate information; and summing up all interferences between respective pairs of basic service sets based on a current channel allocation, the sum result being used as an evaluation of the overall network interference, wherein interference between a pair of basic service sets is deduced from the pair of the calculated visual delayed time for the pair of basic service sets.

Preferably, the step of calculating may include sub-steps of: for a group of first nodes forming a first basic service set and a group of second nodes forming a second basic service set, calculating the visual delayed time of each of the first nodes under the interference from the group of second nodes by using calculated normal transmission time of the first nodes and calculated delayed transmission time of the first nodes; and summing all the visual delayed time of the group of first nodes to obtain a visual delayed time of the first basic service set under the interference from the second basic service set.

Preferably, the step of calculating may further include sub-steps of: calculating normal transmission time of each first node by using the traffic information and the rate information; mapping out lowered transmission rates of the first node by using an SINR-Rate table and based on the received signal strength indicators; and calculating a delayed transmission time of the first node under the interference from the group of second nodes by using the traffic information, the rate information and the mapped lowered transmission rates of the first node.

Preferably, the group of first nodes may include a first access point and a group of first terminals accessing the wireless network via the first access point, and the group of second nodes may include a second access point and a group of second terminals accessing the wireless network via the second access point.

Preferably, the normal transmission time of the first node $Time_x^{(Normal)}$ may be calculated as:

$$Time_x^{(Normal)} = \frac{1}{Rate_x} \times R_x$$

in which $Rate_x$ denotes a normal transmission rate of the first terminal or access point without interference, and $R_x$ denotes a normalized receiving traffic load of the first terminal or access point.

Preferably, for the first terminal, $R_x$ may be obtained by normalizing the receiving traffic load of the first terminal $throughput^x(receiving)$ by the normal transmission rate of the first terminal $Rate_x$ as $$R_x = \frac{throughput^x(receiving)}{Rate_x}.$$

Preferably, for the first access, $R_x$ may be obtained by summing normalized sending traffic loads $L_w$ of the group of first terminals as $$R_x = \sum_{w \in W} L_w,$$

in which W denotes the group of first terminals, $L_w$ is obtained by normalizing the sending traffic load of the first terminal $throughput^w(sending)$ by the normal transmission rate of the first terminal $Rate_w$ as $$L_w = \frac{throughput^w(sending)}{Rate_w}.$$

Preferably, the lowered transmission rates of the first terminal $Rate_x^y$ may be mapped out by using the SINR-Rate table as $$Rate_x^y = Map(RSSI_x^z - RSSI_x^y)$$

in which the value obtained from $RSSI_x^z - RSSI_x^y$ corresponds to the SINR column of the SINR-Rate table, the value of $Rate_x^y$ corresponds to the Rate column of the SINR-Rate table, $RSSI_x^z$ denotes the received signal strength indicator between the first access point and the first terminal, and $RSSI_x^y$ denotes the received signal strength indicator between one second node and the first terminal.

Preferably, the lowered transmission rates of the first access point $Rate_x^y$ may be mapped out by using the SINR-Rate table as $$Rate_x^y = Map(RSSI_x^z - RSSI_x^y)$$

in which the value obtained from $RSSI_x^y - RSSI_x^y$ corresponds to the SINR column of the SINR-Rate table, the value of $Rate_x^y$ corresponds to the Rate column of the SINR-Rate table, $RSSI_x$ denotes the received signal strength indicator of the first access point, and $RSSI_x^y$ denotes the received signal strength indicator between one second node and the first terminal.

Preferably, the received signal strength indicator of the first access point $RSSI_x$ may be obtained by summing the received signal strength indicators $RSSI_x^w$ between the group of first terminals and the first access point weighted by normalized sending traffic loads $L_w$ of the group of first terminals, as $$RSSI_x = \sum_{w \in W} (L_w \cdot RSSI_x^w).$$

Preferably, the delayed transmission time of the first node under the interference from the group of second nodes $Time_{x,Y}^{(Interference)}$ may be calculated as:

$$Time_{x,Y}^{(Interference)} = \frac{1}{\sum_{y \in Y}(L_y \cdot Rate_x^y) + \left(1 - \sum_{y \in Y} L_y\right) \cdot Rate_x} \times R_x$$

in which Y denotes the group of second nodes, and $L_y$ denotes a normalized sending traffic load of one second node and is obtained by normalizing the sending traffic load of the second node $throughput^y(sending)$ by the normal transmission rate of the second node $Rate_y$ as $$L_y = \frac{throughput^y(sending)}{Rate_y}.$$

Preferably, the visual delayed time of the first node under the interference from the group of second nodes $VDT(x,Y)$ may be calculated as:

$$VDT(x,Y) = Time_{x,Y}^{(Interference)} - Time_x^{(Normal)}.$$

Preferably, interference between a pair of basic service sets is equal to the sum of the pair of the calculated visual delayed time for the pair of basic service sets if the pair of basic service sets are using one and the same channel under the current channel allocation, whereas interference between a pair of basic service sets is equal to zero if the pair of basic service sets are using different channels under the current channel allocation.

According to a third aspect of the present invention, there is provided a dynamic channel assignment apparatus used in a wireless network, comprising: a visual delayed time calculator for calculating each pair of visual delayed time for each pair of basic service sets based on received signal strength indicators, traffic information and rate information; an overall network interference calculator for evaluating an overall network interference under a current channel allocation based on the visual delayed time calculated by the visual delayed time calculator; a graph generator for constructing an undirected graph so that each basic service set is located at a vertex, and each connection line between each pair of basic service sets has a weight obtained from the pair of visual delayed time for this pair of basic service sets; a graph coloring unit for coloring the undirected graph generated by the graph generator to get a new channel allocation approach and an optimized minimal overall network interference under this new channel allocation approach; a comparator for comparing a difference between the evaluated overall network interference under the current channel allocation and the optimized minimal overall network interference with a predetermined threshold; and a controller for changing channel allocation for the basic service sets according to the new channel allocation approach if the difference is larger than the predetermined threshold.

Preferably, the graph coloring unit may perform the coloring with the semi-definite programming technology.

Preferably, the weight may be equal to the sum the pair of visual delayed time for the pair of access points.

Preferably, a group of first nodes forms a first basic service set, a group of second nodes forms a second basic service set, and the visual delayed time calculator may include: a node visual delayed time calculator for calculating the visual delayed time of each of the first nodes under the interference from the group of second nodes by using calculated normal transmission time of the first nodes and calculated delayed transmission time of the first nodes; and an adder for summing all the visual delayed time of the group of first nodes to obtain a visual delayed time of the first basic service set under the interference from the second basic service set.

Preferably, the visual delayed time calculator may further include: a normal transmission time calculator for calculating normal transmission time of each first node by using the traffic information and the rate information; a lowered transmission rate mapper for mapping out lowered transmission rates of the first node by using an SINR-Rate table and based on the received signal strength indicators; and a delayed transmission time calculator for calculating a delayed transmission time of the first node under the interference from the group of second nodes by using the traffic information, the rate information and the mapped lowered transmission rates of the first node.

Preferably, the group of first nodes may include a first access point and a group of first terminals accessing the wireless network via the first access point, and the group of second nodes may include a second access point and a group of second terminals accessing the wireless network via the second access point.

Preferably, the overall network interference calculator may evaluate the overall network interference under the current channel allocation as the total sum of all interferences between respective pairs of basic service sets under the current channel allocation, wherein interference between a pair of basic service sets is equal to the sum of the pair of the calculated visual delayed time for the pair of basic service sets if the pair of basic service sets are using one and the same channel under the current channel allocation, whereas interference between a pair of basic service sets is equal to zero if the pair of basic service sets are using different channels under the current channel allocation According to a fourth aspect of the present invention, there is provided an overall network interference evaluating apparatus, comprising: a visual delayed time calculator for calculating each pair of visual delayed time for each pair of basic service sets based on received signal strength indicators, traffic information and rate information; and an overall network interference evaluator for summing up all interferences between respective pairs of basic service sets based on a current channel allocation, the sum result being used as an evaluation of the overall network interference, wherein interference between a pair of basic service sets is deduced from the pair of the calculated visual delayed time for the pair of basic service sets.

Preferably, a group of first nodes forms a first basic service set, a group of second nodes forms a second basic service set, and the visual delayed time calculator may include: a node visual delayed time calculator for calculating the visual delayed time of each of the first nodes under the interference from the group of second nodes by using calculated normal transmission time of the first nodes and calculated delayed transmission time of the first nodes; and an adder for summing all the visual delayed time of the group of first nodes to obtain a visual delayed time of the first basic service set under the interference from the second basic service set.

Preferably, the visual delayed time calculator may further include: a normal transmission time calculator for calculating normal transmission time of each first node by using the traffic information and the rate information; a lowered transmission rate mapper for mapping out lowered transmission rates of the first node by using an SINR-Rate table and based on the received signal strength indicators; and a delayed transmission time calculator for calculating a delayed transmission time of the first node under the interference from the group of second nodes by using the traffic information, the rate information and the mapped lowered transmission rates of the first node.

Preferably, the group of first nodes may include a first access point and a group of first terminals accessing the wireless network via the first access point, and the group of second nodes may include a second access point and a group of second terminals accessing the wireless network via the second access point.

Preferably, interference between a pair of basic service sets is equal to the sum of the pair of the calculated visual delayed time for the pair of basic service sets if the pair of basic service sets are using one and the same channel under the current channel allocation, whereas interference between a pair of basic service sets is equal to zero if the pair of basic service sets are using different channels under the current channel allocation.

As a summary, the invention works as following:

1. The SINR-RATE table is in hand as known knowledge. The table depends on the type of wireless network such as WiFi, Wimax etc. For example, we use WiFi network in our implementation, the table is shown as the above Table 1.
2. Each node in the wireless network performs periodically a measurement process. In the process, the node measures the following information: signal strength from its associated access point (or base station in other kinds of wireless networks) to itself; signal strength from other nodes in its neighboring cells to itself; the traffic amount of other nodes in its neighboring cells; and its own traffic amount.
3. With the information, the node can calculate the interference degree (visual delay time) it is suffering from.
4. The information of each node can be collected by access point (or base station), it can calculate the interference degree the cell is suffering from.

The positive effects of the invention are listed as follows:

1. The interference degree prediction is driven by actual measurements thereby avoiding simplifying assumptions about the nature of wireless signal propagation.
2. It can more accurately imply the network performance running under different settings.
3. The invention does not require changes at the MAC layer and can be implemented through simple software upgrades. The proposals are back compatible with existing network standard such as 802.11.

BRIEF DESCRIPTION OF THE DRAWINGS

The above and other objects, features and advantages of the present invention will be clearer from the following detailed description about the non-limited embodiments of the present invention taken in conjunction with the accompanied drawings, in which.

DETAILED DESCRIPTION OF PREFERRED EMBODIMENTS

Hereunder, the present invention will be described in accordance with the drawings. In the following description, some particular embodiments are used for the purpose of description only, which shall not be understood as any limitation to the present invention but the examples thereof. While it may blur the understanding of the present invention, the conventional structure or construction will be omitted.

Figure 1:
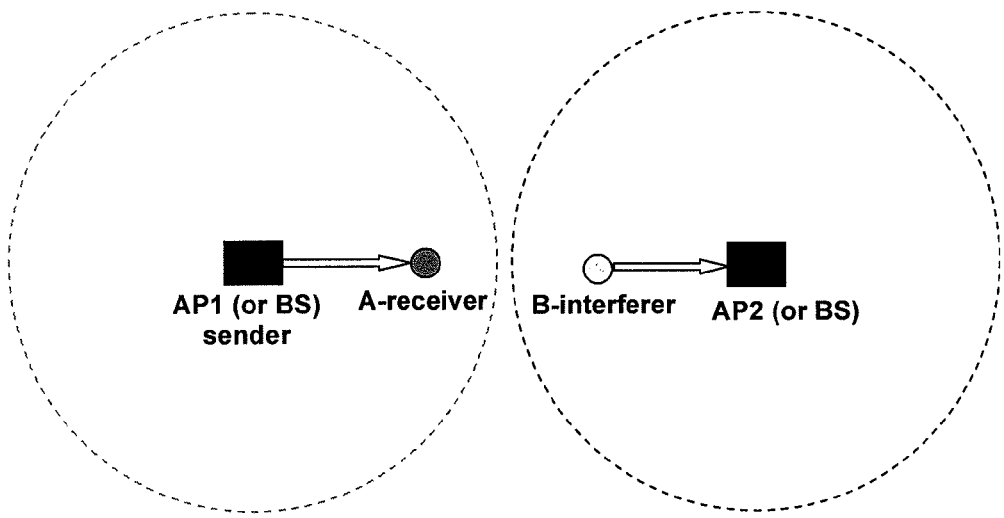
FIG. 1 shows a simple example where the present invention can be applied.

A simple case for the invention applied is shown in FIG. 1. In the cell of AP1, AP1 is transmitting traffic to a node A. In the cell of AP2, a node B is simultaneously transmitting traffic to AP2. When the two cells use the same channel, the node B is an interferer to the receiver—the node A.

To evaluate the interference degree from the node B to the node A, the parameters the node A needs to collect are listed in Table 2.

TABLE 2 parameters to be collected by the receiver

| Parameter | Explanation |
|---|---|
| $Rate_x$ | Without interference, normal transmission rate of node x<br>x ∈ Set of Access Points ∪ Set of Terminals |
| $L_x$ | Normalized sending traffic load of the node x,<br>$L_x$ = throughput$^x$(sending)/$Rate_x$, meaning how much percentage of time is occupied by the node x for sending,<br>$0 \leq L_x \leq 1$<br>x ∈ Set of Access Points ∪ Set of Terminals |
| $R_x$ | Normalized receiving traffic load of the node x,<br>$R_x$ = throughput$^x$(receiving)/$Rate_x$, meaning how much percentage of time is occupied by the node x for receiving,<br>$0 \leq R_x \leq 1$<br>x ∈ Set of Access Points ∪ Set of Terminals |
| $RSSI_x^y$ | RSSI from the node y to the node x<br>x ∈ Set of Access Points ∪ Set of Terminals<br>y ∈ Set of Access Points ∪ Set of Terminals<br>and x ≠ y |
| $RSSI_x$ | Average RSSI of the AP x from its associated terminals to itself<br>x ∈ Set of Access Points |

In Table 2, RSSI denotes Received Signal Strength Indicator, which is reported by all commodity wireless cards, it can be used to estimate the signal strength. For example, in Atheros cards, RSSI is reported as $$10 \log\left(\frac{S+I}{n}\right),$$

where S denotes the strength of the incoming signal, I denotes the interfering energy in the same channel, and n denotes the "noise floor" (generally is about −95 dbm).

To indicate the interference degree, the selection of the interference metrics is the key point of the problem. It decides how to incorporate the parameters together. For example, in the existing methods, the interfering signal strength or the sum of the interfering signal strength and the interfering traffic is used as the interference metric. In the present invention, we propose a new metric—Visual Delayed Time (VDT). We propose such a metric based on the following fact: the sender can lower its transmission rate to prevent packet loss, and as a cost, the transmission time for the same packet must be longer than the case without interference. Therefore, the extra time cost can be used to evaluate interference degree.

$$VDT(x,y) = Time_{x,y}^{(Interference)} - Time_x^{(Normal)} \quad (2)$$

In Equation (2), $Time_x^{(Normal)}$ is the normal transmission time of the node x without interference and $Time_{x,y}^{(Interference)}$ is the delayed transmission time of the node x under the interference from the node y. They are both calculated with the parameters listed in Table 2.

For the simple case where there are one receiver and one interferer (FIG. 1), then $$Time_x^{(Normal)} = \frac{1}{Rate_x} \times R_x \quad (3)$$

$$Time_{x,y}^{(Interference)} = \frac{1}{L_y \cdot Rate_x^y + (1-L_y) \cdot Rate_x} \times R_x \quad (4)$$

where $Rate_x^y$ is node x's lowered transmission rate under the interference of the node y, it can be computed as follows:

$$Rate_x^y = Map(RSSI_x^z - RSSI_x^y) \quad (5)$$

where function Map(.) is the mapping function from SINR to transmission rate according to the SINR-Rate Table, e.g., the above Table 1 for 802.11 network. Herein, the node z is the sender of the node x, and the node y is the interferer of the node x. The value obtained from $RSSI_x^z - RSSI_x^y$ corresponds to the column, SINR, of Table 1. The value of $Rate_x^y$ corresponds to the column, PHY Rate, of Table 1.

Hereunder, a schematic example on how to calculate VDT (A, B) is described in conjunction with FIG. 1. It is assumed that: the node A is the receiver and the node B is the interferer; $Rate_A$=24 Mbps, $Rate_B$=36 Mbps, throughput$^A$(receiving)=12 Mbps, through$^B$(sending)=9 Mbps; $RSSI_A^{AP1}$=24 dbm, $RSSI_A^B$=10 dbm. Therefore, $L_B$=0.25 and $R_A$=0.5 according to their definitions in Table 2. Following Equation (3), $$Time_x^{(Normal)} = \frac{1}{24 \text{ Mbps}} \times 0.5 = 20.83 \text{ ns.}$$

According to Equation (5) and Table 1, $Rate_A^B$=Map(14 dbm)=11 Mbps since 14 dbm is larger than 6.99 dbm and smaller than 23 dbm. So, referring to Equation (4), $$Time_{x,y}^{(Interference)} = \frac{1}{0.25 \cdot 11 \text{ Mbps} + 0.75 \cdot 24 \text{ Mbps}} \times 0.5 = 24.10 \text{ ns.}$$

As the result, VDT(x,y)=24.10 ns−20.83 ns=3.27 ns.

Figure 2:
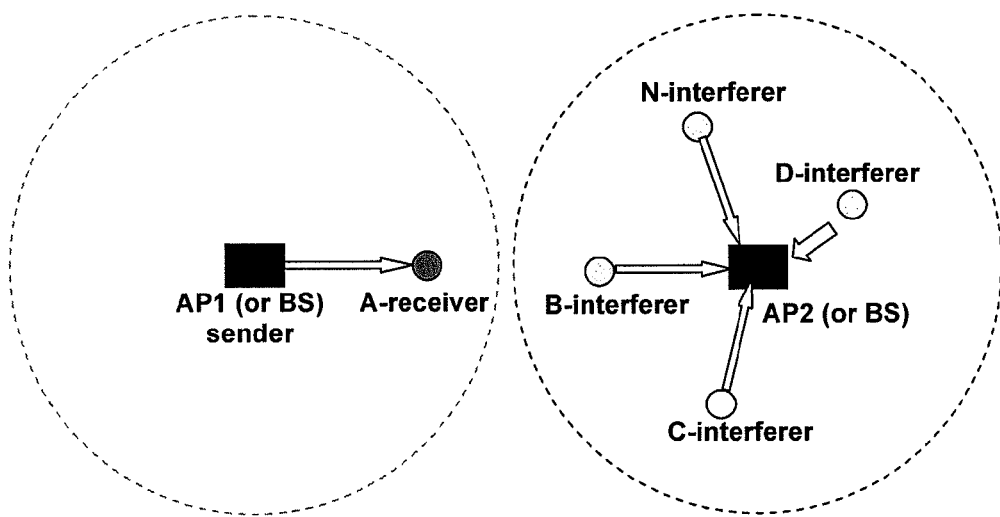
FIG. 2 shows another example where there are multiple interferers.

For the case where there are multiple interferers shown in the FIG. 2, $Time_x^{(Normal)}$ is still computed with Equation (3). $Time_{x,Y}^{(Interference)}$ is computed with the following Equation (6). Let Y be the set of interferers (Y={B, C, . . . N}), $$Time_{x,Y}^{(Interference)} = \frac{1}{\sum_{y \in Y}(L_y \cdot Rate_x^y) + (1 - \sum_{y \in Y} L_y) \cdot Rate_x} \times R_x \quad (6)$$

where $Rate_x^y$ is obtained according to Equation (5).

Therefore, in the case of multiple interferers, the Visual Delayed Time (VDT) shown in Equation (2) will be rewritten as:

$$VDT(x,Y) = Time_{x,Y}^{(Interference)} - Time_x^{(Normal)} \quad (2')$$

For the case where AP is a receiver, AP's good signal in Equation (5) is different from that of stations because AP's receiving traffic comes from multiple senders. Assuming X is the set for all the stations associated with AP, there is the following equation:

$$\sum_{x \in X} L_x = R_{AP}.$$

In the invention, the AP's good signal is estimated with the following Equation (7):

$$RSSI_{AP} = \sum_{x \in X}(L_x \cdot RSSI_{AP}^x) \quad (7)$$

If we want to calculate the interference of the whole BSS X, it simply equals to the sum of the VDT of each node in the BSS. In other words, $$VDT_X^Y = \sum_{x \in X} VDT(x, Y) \quad (8)$$

VDT(x,Y) can be calculated with Equations (2)-(6) and (2').

Now, we will discuss how to use VDT to solve the dynamic channel assignment problem in the WLAN. We model the wireless networks as a general undirected graph with the set of vertexes V={1, 2, . . . , n}, which represent n BSSs in the network. There are K orthogonal channels available in the network and let set κ={1, 2, . . . , K}. The channel assignment can be expressed as a problem to compute a function F: V→κ to minimize the overall network interference $$\sum_{X,Y \in V} I(X, Y),$$

in which the interference between the BSS X and the BSS Y I(X,Y) is defined as:

$$I(X, Y) = \begin{cases} VDT_X^Y + VDT_Y^X & F(X) = F(Y) \\ 0 & F(X) \neq F(Y) \end{cases} \quad (9)$$

in which F(X)=F(Y) means that the BSS X and the BSS Y are using one and the same channel, whereas F(X)≠F(Y) means that the BSS Y are using different channels.

Optimizing the problem is known to be NP-hard. In this invention, we use centralized method to solve this problem. For small scale (n≦12 and K≦3), we can use brute-force search to achieve the best assignment. For large scale case, we use semi-definite programming technology (SDP) to get an approximate result. SDP is generally known as the Minimum k-Partition (MkP) problem, which can be viewed as the equivalent problem of the channel assignment. The details of the MkP approach can be referred to Reference [5], and for the simplicity of the description and avoidance of unwanted blurring of the subject of the present invention, the details thereof are omitted herein.

Figure 3A:
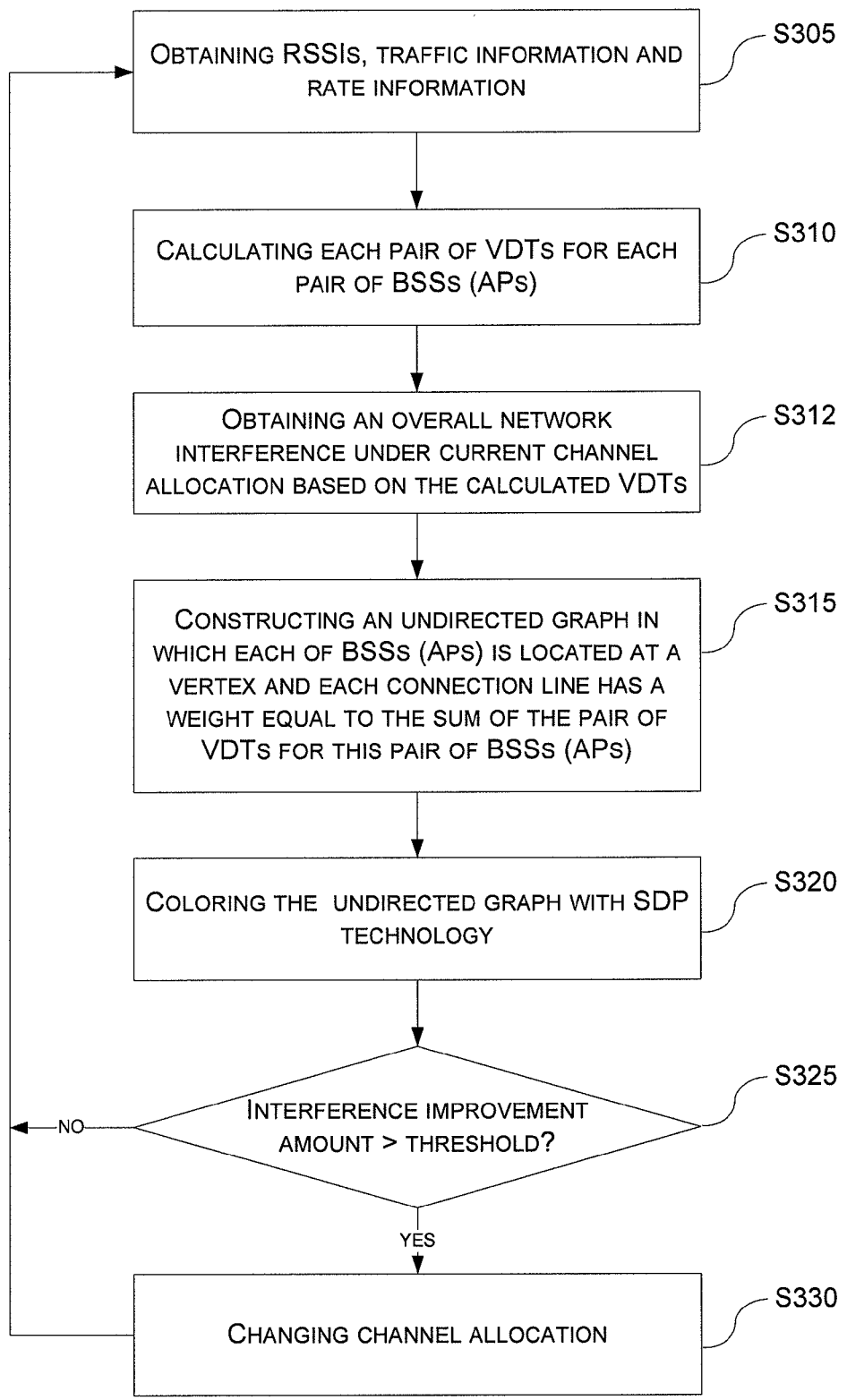
FIG. 3A shows a flowchart of the dynamic channel assignment method of the present invention.

FIG. 3A shows a flowchart of the dynamic channel assignment method of the present invention.

Based on the above principle descriptions, the dynamic channel assignment method according to the present invention will be described by referring to FIG. 3A. In the step S305, the RSSIs, traffic information and rate information are obtained from APs and terminals. In the step S310, each pair of visual delayed times for each pair of Basic Service Sets (APs) are calculated based on the RSSIs, traffic information and rate information. In particularly, the visual delayed times are calculated by referring to the above Equations (2)-(8) and (2') and SINR-Rate table (e.g. the above Table 1). In the step S312, an overall network interference under current channel allocation is evaluated based on the visual delayed times obtained in the step S310. In particularly, the overall network interference under the current channel allocation can be evaluated as the total sum of all interferences between respective pairs of Basic Service Sets under the current channel allocation, wherein interference between a pair of Basic Service Sets is equal to the sum of the pair of visual delayed times for the pair of Basic Service Sets obtained in the step S310 if the pair of Basic Service Sets are using one and the same channel under the current channel allocation, whereas interference between a pair of Basic Service Sets is equal to zero if the pair of Basic Service Sets are using different channels under the current channel allocation. In the step S315, an undirected graph is constructed so that each Basic Service Set (AP) is located at a vertex, and each connection line between each pair of Basic Service Sets (APs) has a weight equal to the sum of the pair of visual delayed times for this pair of Basic Service Sets (APs) which are obtained in the step S310. In the step S320, the undirected graph is colored, particularly with the semi-definite programming technology, to get a new channel allocation approach and the optimized minimal overall network interference under this new channel allocation approach. In the step S325, a difference (interference improvement amount) between the evaluated overall network interference and the optimized minimal overall network interference respectively obtained in the step S312 and S320 is compared with a predetermined threshold. If the difference is larger than the threshold ("Yes" in step S325) which means the overall system performance will be greatly improved, the channel allocation for the Basic Service Sets (APs) is changed in the step S330 according to the new channel allocation approach. Otherwise, if the difference is not larger than the threshold ("No" in step S325) which means the overall system performance will not be greatly improved, the channel allocation for the Basic Service Sets (APs) is remained as it is. The dynamic channel assignment method of the present invention will continue monitoring the system (either periodical or with some triggering mechanisms).

Figure 3B:
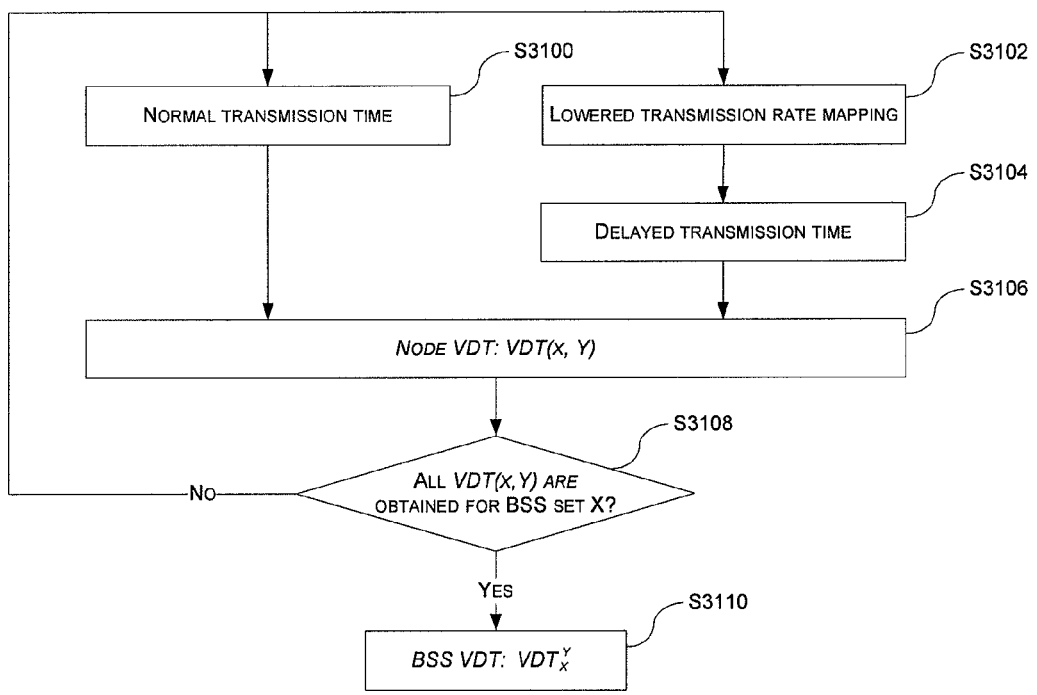
FIG. 3B shows the details of the VDT calculating step in FIG. 3A.

FIG. 3B shows the details of the VDT calculating step S310. In the step S3100, the normal transmission time of the node x (belonging to one BSS, set X) $Time_x^{(Normal)}$ is calculated according to Equation (3) by using the traffic information and the rate information. In the step S3102, the lowered transmission rates of the node x $Rate_x^y$ are mapped out by using the SINR-Rate Table (for example, the above Table 1) and based on the RSSIs information between each node and the node x. In the step S3104, the delayed transmission time of the node x under the interference from the interferers set Y (another BSS) $Time_{x,y}^{(Interference)}$ is calculated according to Equation (6) by using the traffic information, the rate information, and the mapped lowered transmission rate of the node x $Rate_x^y$ obtained in the step S3102. In the step S3106, the visual delayed time of the node x under the interference from the interferers set Y VDT(x,Y) is calculated according to Equation (2') by using the calculated normal transmission time of the node x $Time_x^{(Normal)}$ and the calculated delayed transmission time of the node x $Time_{x,y}^{(Interference)}$ respectively obtained in the step S3100 and S3104. In the step S3108, it is determined whether the visual delayed times VDT(x,Y) for all the node x belonging to the set X are obtained or not, i.e., whether all the node x belonging to the set X are processed or not. If so ("Yes" in the step S3108), it goes to the step S3110 in which the visual delayed transmission time of the one BSS set X under the interference from the another BSS set Y $VDT_X^Y$ is calculated as the sum of the visual delayed time VDT(x,Y) for all the node x belonging to the set X according to Equation (8). If the visual delayed times VDT(x,Y) for all the node x belonging to the set X are not obtained yet ("No" in the step S3108), then another node x belonging to the set X is selected and the process returns to the step S3100 and S3102.

Similarly, for each node y belonging to the another BSS set Y and the interferers set X, the above steps S3100-S3110 are performed to obtain the visual delayed transmission time of the another BSS set Y under the interference from the one BSS set X $VDT_Y^X$.

Accordingly, for each pair of BSS sets X and Y, one pair of visual delayed times $VDT_X^Y$ and $VDT_Y^X$ are obtained.

Figure 4A:
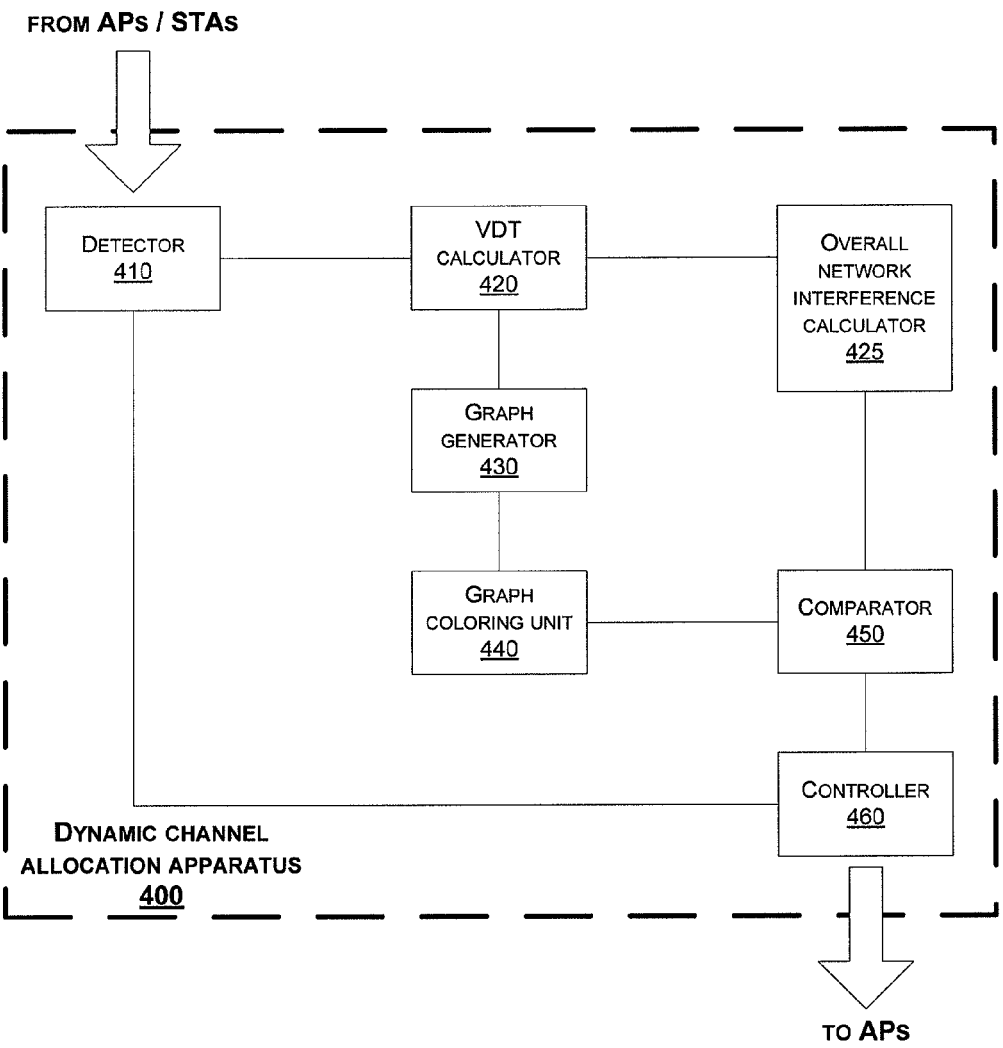
FIG. 4A shows a schematic diagram of the dynamic channel assignment apparatus of the present invention.

FIG. 4A shows a schematic diagram of the dynamic channel assignment apparatus of the present invention.

As shown in FIG. 4A, the dynamic channel assignment apparatus 400 of the present invention includes: a detector 410 for detecting the RSSIs, traffic information and rate information from APs and terminals; a visual delayed time (VDT) calculator 420 for calculating each pair of visual delayed times for each pair of Basic Service Sets (APs) based on the RSSIs, traffic information and rate information detected by the detector 410, in which the visual delayed times are calculated by referring to the above Equations (2)-(8) and (2') and SINR-Rate table (e.g. the above Table 1); an overall network interference calculator 425 for evaluating an overall network interference under current channel allocation based on the visual delayed times calculated by the VDT calculator 420, in which the overall network interference under the current channel allocation can be evaluated as the total sum of all interferences between respective pairs of Basic Service Sets under the current channel allocation, wherein interference between a pair of Basic Service Sets is equal to the sum of the pair of visual delayed times for the pair of Basic Service Sets calculated by the VDT calculator 420 if the pair of Basic Service Sets are using one and the same channel under the current channel allocation, whereas interference between a pair of Basic Service Sets is equal to zero if the pair of Basic Service Sets are using different channels under the current channel allocation; a graph generator 430 for constructing an undirected graph so that each Basic Service Set (AP) is located at a vertex and each connection line between each pair of Basic Service Sets (APs) has a weight equal to the sum of the pair of visual delayed times for this pair of Basic Service Sets (APs) calculated by the VDT calculator 420; a graph coloring unit 440 for coloring the undirected graph constructed by the graph generator 430, particularly with the semi-definite programming (SDP) technology, to get a new channel allocation approach and the optimized minimal overall network interference under this new channel allocation approach; a comparator 450 for comparing a difference (interference improvement amount) between the evaluated overall network interference and the optimized minimal overall network interference respectively obtained by the overall network interference calculator 425 and the graph coloring unit 440 with a predetermined threshold; a controller 460 for changing the channel allocation for the Basic Service Sets (APs) according to the new channel allocation approach if the comparison result from the comparator 450 indicates that the difference is larger than the threshold which means the overall system performance will be greatly improved. Otherwise, if the comparison result from the comparator indicates that the difference is not larger than the threshold which means the overall system performance will not be greatly improved, the controller 460 will remain the channel allocation for the Basic Service Sets (APs) as it is. The dynamic channel assignment apparatus 400 of the present invention will continue monitoring the system (either periodical or with some triggering mechanisms).

Figure 4B:
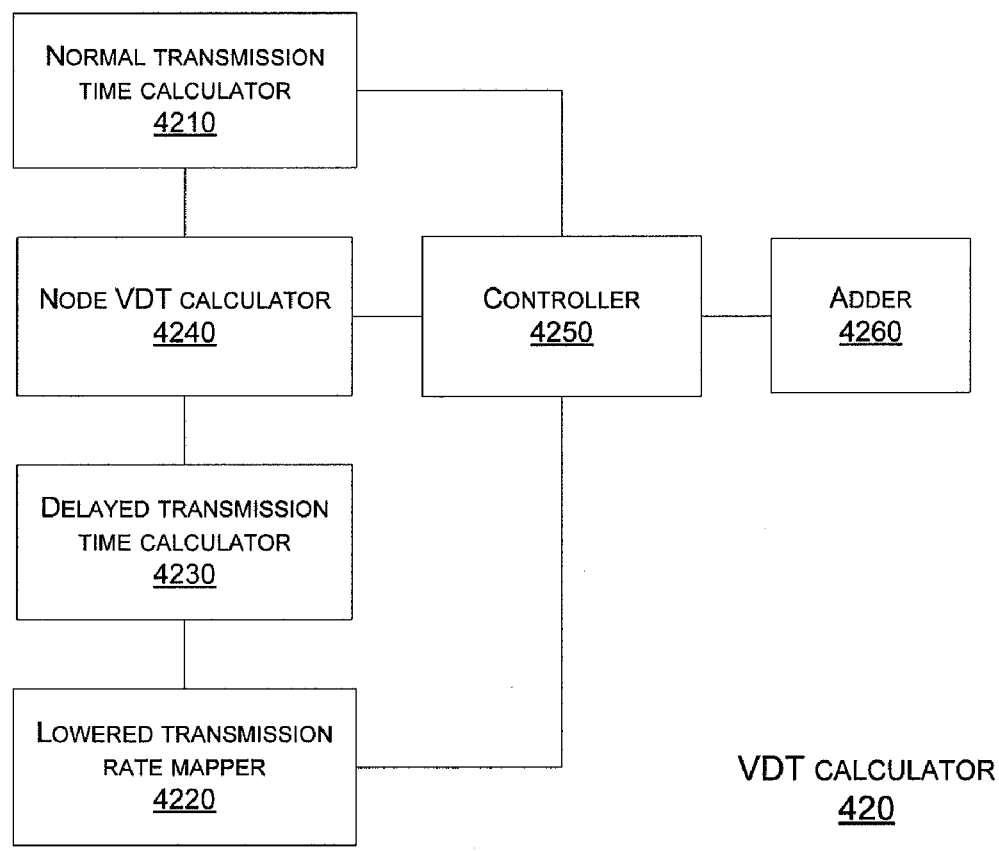
FIG. 4B shows the details of the VDT calculator in FIG. 4A.

FIG. 4B shows the details of the VDT calculator 420. The VDT calculator 420 includes a normal transmission time calculator 4210, a lowered transmission rate mapper 4220, a delayed transmission time calculator 4230, a node VDT calculator 4240, a controller 4250 and an adder 4260.

The normal transmission time calculator 4210 calculates the normal transmission time of the node x (belonging to one BSS, set X) $Time_x^{(Normal)}$ according to Equation (3) by using the traffic information and the rate information.

The lowered transmission rate mapper 4220 maps out the lowered transmission rate of the node x $Rate_x^y$ by using the SINR-Rate Table (for example, the above Table 1) and based on the RSSIs information between each node and the node x.

The delayed transmission time calculator 4230 calculates the delayed transmission time of the node x under the interference from the interferers set Y (another BSS) $Time_{x,y}^{(Interference)}$ according to Equation (6) by using the traffic information, the rate information, and the mapped lowered transmission rate of the node x $Rate_x^y$ mapped out by the lowered transmission rate mapper 4220.

The node VDT calculator 4240 calculates the visual delayed time of the node x under the interference from the interferers set Y VDT(x,Y) according to Equation (2') by using the calculated normal transmission time of the node x $Time_x^{(Normal)}$ and the calculated delayed transmission time of the node x $Time_{x,y}^{(Interference)}$ respectively calculated by the normal transmission time calculator 4210 and the delayed transmission time calculator 4230.

The controller 4250 determines whether the visual delayed times VDT(x,Y) for all the node x belonging to the set X are obtained or not, i.e., whether all the node x belonging to the set X are processed or not.

If the controller 4250 determines that the visual delayed times VDT(x,Y) for all the node x belonging to the set X are obtained, the controller 4250 transfers the visual delayed times VDT(x,Y) for all the node x belonging to the set X calculated by the node VDT calculator 4240 to the adder 4260, and the adder 4260 calculates the visual delayed transmission time of the one BSS set X under the interference from the another BSS set Y $VDT_X^Y$ as the sum of the visual delayed time VDT(x,Y) for all the node x belonging to the set X according to Equation (8).

If the controller 4250 determines that the visual delayed times VDT(x,Y) for all the node x belonging to the set X are not obtained yet, then the controller 4250 selects another node x belonging to the set X and invokes the normal transmission time calculator 4210, the lowered transmission rate mapper 4220, the delayed transmission time calculator 4230 and the node VDT calculator 4240 to calculate the visual delayed time of the newly selected node x belonging to the set X under the interference from the interferers set Y VDT(x,Y).

Similarly, for each node y belonging to the another BSS set Y and the interferers set X, the normal transmission time calculator 4210, the lowered transmission rate mapper 4220, the delayed transmission time calculator 4230, the node VDT calculator 4240, a controller 4250 and an adder 4260 performs the same processes to obtain the visual delayed transmission time of the another BSS set Y under the interference from the one BSS set X $VDT_Y^X$.

Accordingly, for each pair of BSS sets X and Y, one pair of visual delayed times $VDT_X^Y$ and $VDT_Y^X$ are obtained by the VDT calculator 420.

The foregoing description gives only the preferred embodiments of the present invention and is not intended to limit the present invention in any way. Thus, any modification, substitution, improvement or like made within the spirit and principle of the present invention should be encompassed by the scope of the present invention.

Reference List

[1] Colin McDiarmid and Bruce Reed, "Channel Assignment And Weighted Coloring", 2000.
[2] JP 2006-054849, YAMANE KOJI, "Method Of Automatic Channel Design Decision And Automatic Channel Allocation System For Access Point"
[3] U.S. Pat. No. 7,110,374 B2, R. Malhotra, P. Busch, Lucent Tech Inc. "Wireless LAN with Dynamic Channel"
[4] Arunesh Mishra, Suman Banerjee, and William Arbaugh, "Weighted Coloring Based Channel Assignment For WLANs", Mobile Computer Communications Review (MC2R), vol. 9, no. 3, 2005.
[5] A. Frieze and M. Jerrum. Improved approximation algorithms for MAX k-CUT and MAX BISECTION. Algorithmica, 18, 1997.

What is claimed is:

1. A dynamic channel assignment method used in a wireless network, comprising steps of:
 calculating, using visual delayed times which comprise pairs of visual delayed time and basic service sets, each pair of visual delayed time for each pair of basic service sets based on received signal strength indicators, traffic information and rate information, and evaluating an overall network interference under a current channel allocation based on the calculated visual delayed time;
 constructing, using connection lines, an undirected graph so that each basic service set of the basic service sets is located at a vertex, and each connection line between each pair of basic service sets has a weight obtained from the pair of visual delayed time for this pair of basic service sets;
 coloring the undirected graph to get a new channel allocation approach and an optimized minimal overall network interference under the new channel allocation approach;
 comparing a difference between the evaluated overall network interference under the current channel allocation and the optimized minimal overall network interference with a predetermined threshold; and
 changing channel allocation for the pair of basic service sets according to the new channel allocation approach if the difference is larger than the predetermined threshold,
 wherein the step of calculating includes sub-steps of:
 for a group of first nodes forming a first basic service set and a group of second nodes forming a second basic service set;
 calculating normal transmission time of each first node by using the traffic information and the rate information;
 mapping out lowered transmission rates of the first nodes by using an Signal to Interference Noise Ratio-Rate table and based on the received signal strength indicators; and
 calculating a delayed transmission time of the first nodes under interference from the group of second nodes by using the traffic information, the rate information and the mapped lowered transmission rates of the first nodes;
 calculating the visual delayed time of each of the first nodes under the interference from the group of second nodes by using the calculated normal transmission time of the first nodes and the calculated delayed transmission time of the first nodes; and
 summing all the visual delayed time of the group of first nodes to obtain a visual delayed time of the first basic service set under the interference from the second basic service set.

2. The dynamic channel assignment method according to claim 1, wherein the coloring is done with semi-definite programming technology.

3. The dynamic channel assignment method according to claim 1, wherein the weight is equal to the sum the pair of visual delayed time for a pair of access points.

4. The dynamic channel assignment method according to claim 1, wherein the group of first nodes includes a first access point and a group of first terminals accessing the wireless network via the first access point, and the group of second nodes includes a second access point and a group of second terminals accessing the wireless network via the second access point.

5. The dynamic channel assignment method according to claim 1, wherein the overall network interference under the current channel allocation is evaluated as the total sum of all interferences between respective pairs of basic service sets under the current channel allocation,
 wherein interference between the pair of basic service sets is equal to the sum of the pair of the calculated visual delayed time for the pair of basic service sets if the pair of basic service sets are using one and the same channel under the current channel allocation,
 whereas interference between the pair of basic service sets is equal to zero if the pair of basic service sets are using different channels under the current channel allocation.

6. A dynamic channel assignment apparatus used in a wireless network, comprising:
 a visual delayed time calculator using visual delayed times which comprise pairs of visual delayed time and basic service sets, for calculating each pair of visual delayed time for each pair of basic service sets based on received signal strength indicators, traffic information and rate information;
 an overall network interference calculator for evaluating an overall network interference under a current channel allocation based on the visual delayed time calculated by the visual delayed time calculator;
 a graph generator using connection lines, for constructing an undirected graph so that each basic service set of the basic service sets is located at a vertex, and each connection line between each pair of basic service sets has a weight obtained from the pair of visual delayed time for this pair of basic service sets;

a graph coloring unit for coloring the undirected graph generated by the graph generator to get a new channel allocation approach and an optimized minimal overall network interference under the new channel allocation approach;

a comparator for comparing a difference between the evaluated overall network interference under the current channel allocation and the optimized minimal overall network interference with a predetermined threshold; and a controller for changing channel allocation for the pair of basic service sets according to the new channel allocation approach if the difference is larger than the predetermined threshold, wherein a group of first nodes forms a first basic service set, a group of second nodes forms a second basic service set, and the visual delayed time calculator includes:

a normal transmission time calculator for calculating normal transmission time of each first node by using the traffic information and the rate information;

a lowered transmission rate mapper for mapping out lowered transmission rates of the first nodes by using an Signal to Interference Noise Ratio-Rate table and based on the received signal strength indicators;

a delayed transmission time calculator for calculating a delayed transmission time of the first nodes under interference from the group of second nodes by using the traffic information, the rate information and the mapped lowered transmission rates of the first nodes;

a node visual delayed time calculator for calculating the visual delayed time of each of the first nodes under the interference from the group of second nodes by using the calculated normal transmission time of the first nodes and the calculated delayed transmission time of the first nodes; and an adder for summing all the visual delayed time of the group of first nodes to obtain a visual delayed time of the first basic service set under the interference from the second basic service set.

7. The dynamic channel assignment apparatus according to claim 6, wherein the graph coloring unit performs the coloring with semi-definite programming technology.

8. The dynamic channel assignment apparatus according to claim 6, wherein the weight is equal to the sum the pair of visual delayed time for a pair of access points.

9. The dynamic channel assignment apparatus according to claim 6, wherein the group of first nodes includes a first access point and a group of first terminals accessing the wireless network via the first access point, and the group of second nodes includes a second access point and a group of second terminals accessing the wireless network via the second access point.

10. The dynamic channel assignment apparatus according to claim 6, wherein the overall network interference calculator evaluates the overall network interference under the current channel allocation as the total sum of all interferences between respective pairs of basic service sets under the current channel allocation, wherein interference between a pair of basic service sets is equal to the sum of the pair of the calculated visual delayed time for the pair of basic service sets if the pair of basic service sets are using one and the same channel under the current channel allocation, whereas interference between a pair of basic service sets is equal to zero if the pair of basic service sets are using different channels under the current channel allocation.

* * * * *

UNITED STATES PATENT AND TRADEMARK OFFICE
CERTIFICATE OF CORRECTION

Page 1 of 1

PATENT NO. : 8,411,585 B2
APPLICATION NO. : 12/498878
DATED : April 2, 2013
INVENTOR(S) : Yongqiang Liu et al.

It is certified that error appears in the above-identified patent and that said Letters Patent is hereby corrected as shown below:

In the Specification

Column 5, Line 63: Delete "$RSSI_x^z$" and insert -- $RSSI_x$ --

Column 5, Line 64: Delete "$RSSI_x^y$" and insert -- $RSSI_x$ --

Column 6, Line 6: Delete "$RSSI_x^w$" and insert -- $RSSI_w^x$ --

Column 10, Line 45: Delete "through$^B$" and insert -- throughout$^B$ --

Signed and Sealed this
Fourth Day of November, 2014

Michelle K. Lee
*Deputy Director of the United States Patent and Trademark Office*